US011301267B2

(12) United States Patent
    Vattikuti et al.

(10) Patent No.: US 11,301,267 B2
(45) Date of Patent: Apr. 12, 2022

(54) AUTOMATED TASK MANAGEMENT TECHNIQUES

(71) Applicant: ServiceNow, Inc., Santa Clara, CA (US)

(72) Inventors: Srilakshmi Choudary Vattikuti, Issaquah, WA (US); Brandon Thomas Trudel, Bellevue, WA (US); Romit Banerjee, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/882,040

(22) Filed: May 22, 2020

(65) Prior Publication Data

US 2021/0365275 A1    Nov. 25, 2021

(51) Int. Cl.
    *G06F 9/451*      (2018.01)
    *G06F 9/48*       (2006.01)
    *G06F 9/50*       (2006.01)
    *G06F 3/0481*     (2013.01)
    *G06F 3/04812*    (2022.01)
    *G06F 3/04817*    (2022.01)

(52) U.S. Cl.
    CPC .......... *G06F 9/451* (2018.02); *G06F 3/04812* (2013.01); *G06F 3/04817* (2013.01); *G06F 9/4881* (2013.01); *G06F 9/5072* (2013.01)

(58) Field of Classification Search
    CPC ...... G06F 9/451; G06F 9/4881; G06F 9/5072; G06F 3/04812; G06F 3/04817
    See application file for complete search history.

(56) References Cited

U.S. PATENT DOCUMENTS

| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |

(Continued)

OTHER PUBLICATIONS

Ten Six Consulting, "Monitoring Schedule Slippage in Microsoft Project", published on Sep. 25, 2017 to https://tensix.com/2017/09/monitoring-schedule-slippage-in-microsoft-project, retrieved Aug. 10, 2021 (Year: 2017).*

(Continued)

*Primary Examiner* — Shourjo Dasgupta
(74) *Attorney, Agent, or Firm* — Fletcher Yoder PC

(57) ABSTRACT

A system has a processor and a memory accessible by the processor and storing instructions, that when executed by the processor, cause the processor to generate a graphical user interface (GUI) for display on a display device. The GUI may include a job management dashboard that has multiple graphical icons that are representative of respective jobs associated with a client instance. The processor may receive one or more user inputs indicative of a selection of a particular graphical icon in the job management dashboard and transmit an update to GUI to the display device. The updated GUI may include a job overview window associated with a particular job, and the job overview window may display a graph of multiple run times associated with the particular job over a period of time.

20 Claims, 9 Drawing Sheets

(56) References Cited

U.S. PATENT DOCUMENTS

| | | | |
|---|---|---|---|
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,392,300 | B2 | 6/2008 | Anantharangachar |
| 7,610,512 | B2 | 10/2009 | Gerber |
| 7,617,073 | B2 | 11/2009 | Trinon |
| 7,685,167 | B2 | 3/2010 | Mueller |
| 7,689,628 | B2 | 3/2010 | Garg |
| 7,716,353 | B2 | 5/2010 | Golovinsky |
| 7,769,718 | B2 | 8/2010 | Murley |
| 7,783,744 | B2 | 8/2010 | Garg |
| 7,890,802 | B2 | 2/2011 | Gerber |
| 7,925,981 | B2 | 4/2011 | Pourheidari |
| 7,930,396 | B2 | 4/2011 | Trinon |
| 7,933,927 | B2 | 4/2011 | Dee |
| 7,945,860 | B2 | 5/2011 | Vambenepe |
| 7,966,398 | B2 | 6/2011 | Wiles |
| 8,051,164 | B2 | 11/2011 | Peuter |
| 8,082,222 | B2 | 12/2011 | Rangarajan |
| 8,151,261 | B2 | 4/2012 | Sirota |
| 8,224,683 | B2 | 7/2012 | Manos |
| 8,266,096 | B2 | 9/2012 | Navarrete |
| 8,380,645 | B2 | 2/2013 | Kowalski |
| 8,402,127 | B2 | 3/2013 | Solin |
| 8,457,928 | B2 | 6/2013 | Dang |
| 8,478,569 | B2 | 7/2013 | Scarpelli |
| 8,554,750 | B2 | 10/2013 | Rangaranjan |
| 8,555,281 | B1 * | 10/2013 | van Dijk ............... G06F 9/4881 718/100 |
| 8,612,408 | B2 | 12/2013 | Trinon |
| 8,646,093 | B2 | 2/2014 | Myers |
| 8,674,992 | B2 | 3/2014 | Poston |
| 8,689,241 | B2 | 4/2014 | Naik |
| 8,743,121 | B2 | 6/2014 | De Peuter |
| 8,745,040 | B2 | 6/2014 | Kowalski |
| 8,812,539 | B2 | 8/2014 | Milousheff |
| 8,818,994 | B2 | 8/2014 | Kowalski |
| 8,832,652 | B2 | 9/2014 | Mueller |
| 8,887,133 | B2 | 11/2014 | Behnia |
| 9,015,188 | B2 | 4/2015 | Behne |
| 9,037,536 | B2 | 5/2015 | Vos |
| 9,065,783 | B2 | 6/2015 | Ding |
| 9,098,322 | B2 | 8/2015 | Apte |
| 9,122,552 | B2 | 9/2015 | Whitney |
| 9,137,115 | B2 | 9/2015 | Mayfield |
| 9,239,857 | B2 | 1/2016 | Trinon |
| 9,317,327 | B2 | 4/2016 | Apte |
| 9,323,801 | B2 | 4/2016 | Morozov |
| 9,348,671 | B1 * | 5/2016 | Chen ................... G06F 11/3409 |
| 9,363,252 | B2 | 6/2016 | Mueller |
| 9,412,084 | B2 | 9/2016 | Kowalski |
| 9,467,344 | B2 | 10/2016 | Gere |
| 9,535,737 | B2 | 1/2017 | Joy |
| 9,613,070 | B2 | 4/2017 | Kumar |
| 9,645,833 | B2 | 5/2017 | Mueller |
| 9,654,473 | B2 | 5/2017 | Miller |
| 9,659,051 | B2 | 5/2017 | Hutchins |
| 9,766,935 | B2 | 9/2017 | Kelkar |
| 9,792,387 | B2 | 10/2017 | George |
| 9,805,322 | B2 | 10/2017 | Kelkar |
| 9,852,165 | B2 | 12/2017 | Morozov |
| 10,002,203 | B2 | 6/2018 | George |
| 10,320,611 | B2 | 6/2019 | Tero et al. |
| 10,445,702 | B1 * | 10/2019 | Hunt .................. G06Q 10/1097 |
| 10,467,050 | B1 * | 11/2019 | Schmidgall ......... G06F 3/04842 |
| 10,742,504 | B2 | 8/2020 | Tero et al. |
| 10,747,757 | B1 | 8/2020 | Puvvada et al. |
| 10,819,593 | B1 * | 10/2020 | Parthasarathy ......... H04L 67/42 |
| 2009/0089785 | A1 * | 4/2009 | Marwinski .............. G06F 9/465 718/102 |
| 2009/0254517 | A1 * | 10/2009 | Dalton .................... G06F 9/542 |
| 2011/0131448 | A1 * | 6/2011 | Vasil ..................... G06F 9/5038 714/19 |
| 2012/0109984 | A1 * | 5/2012 | Clark, Jr ............... G06F 16/248 707/754 |
| 2014/0189416 | A1 * | 7/2014 | Tajima .................. G06F 9/4881 713/600 |
| 2015/0221056 | A1 * | 8/2015 | Jones ................... G06Q 10/109 705/326 |
| 2015/0269524 | A1 * | 9/2015 | Greene ............... G06F 3/04847 705/301 |
| 2016/0284083 | A1 * | 9/2016 | Singh ..................... G16H 40/20 |
| 2017/0255357 | A1 * | 9/2017 | Judd ..................... G06F 3/0482 |
| 2018/0018084 | A1 * | 1/2018 | Kim .................... G06F 3/04883 |
| 2018/0152407 | A1 * | 5/2018 | Soni ........................ H04L 51/34 |
| 2018/0165122 | A1 * | 6/2018 | Dobrev ............... G06F 9/45558 |
| 2018/0239959 | A1 * | 8/2018 | Bui ...................... G06F 40/103 |
| 2019/0065018 | A1 * | 2/2019 | Keam ..................... G06F 15/16 |
| 2019/0266268 | A1 | 8/2019 | Polinati et al. |
| 2019/0347603 | A1 * | 11/2019 | Vacha ..................... G06F 9/451 |
| 2020/0084115 | A1 | 3/2020 | Biran et al. |
| 2020/0310724 | A1 * | 10/2020 | Aher ..................... G06F 3/1289 |
| 2021/0035048 | A1 * | 2/2021 | Adams .................. H04L 9/3239 |
| 2021/0216363 | A1 * | 7/2021 | Ahnn .................... G06F 16/951 |

OTHER PUBLICATIONS

"8 Methods of Identifying Delayed Tasks in MS Project", published on Feb. 22, 2015 to https://www.techno-pm.com/2015/02/highlight-track-tasks-msproject.html, retrieved Aug. 10, 2021 (Year: 2015).*

"How to show if a task is overdue?", published on Mar. 16, 2015 to https://social.technet.microsoft.com/Forums/en-US/d25307a6-0d03-4099-8f29-6a10a838a286/how-to-show-if-a-task-is-overdue?forum=projectprofessional2010general, retrieved Aug. 10, 2021 (Year: 2015).*

Sonya Siderova, "The Kanban Way: How to Visualize Progress and Data in Trello", published on Oct. 25, 2019 to https://blog.trello.com/kanban-data-nave, retrieved Aug. 10, 2021 (Year: 2019).*

* cited by examiner

FIG. 6

| | | SCHEDULED JOB CONTROL BOARD | | ALL ▼ | Q SEARCH BY NAME | ADD NEW |
|---|---|---|---|---|---|---|
| WEEK \| MONTH | | | | | | |
| MON 7-16-2018 25 SCHEDULED JOBS | TUE 7-17-2018 25 SCHEDULED JOBS | WED 7-18-2018 23 SCHEDULED JOBS | THUR 7-19-2018 23 SCHEDULED JOBS | FRI 7-20-2018 25 SCHEDULED JOBS | SAT 7-21-2018 23 SCHEDULED JOBS | SUN 7-22-2018 25 SCHEDULED JOBS |
| MON 7-23-2018 24 SCHEDULED JOBS | TUE 7-24-2018 25 SCHEDULED JOBS | WED 7-25-2018 23 SCHEDULED JOBS | THUR 7-26-2018 23 SCHEDULED JOBS | FRI 7-27-2018 25 SCHEDULED JOBS | SAT 7-28-2018 23 SCHEDULED JOBS | SUN 7-29-2018 25 SCHEDULED JOBS |
| MON 7-30-2018 24 SCHEDULED JOBS | TUE 7-31-2018 25 SCHEDULED JOBS | WED 8-1-2018 23 SCHEDULED JOBS | THUR 8-2-2018 26 SCHEDULED JOBS | FRI 8-3-2018 26 SCHEDULED JOBS | SAT 8-4-2018 24 SCHEDULED JOBS | SUN 8-5-2018 25 SCHEDULED JOBS |
| MON 8-6-2018 24 SCHEDULED JOBS | TUE 8-7-2018 25 SCHEDULED JOBS | WED 8-8-2018 23 SCHEDULED JOBS | THUR 8-9-2018 23 SCHEDULED JOBS | FRI 8-10-2018 25 SCHEDULED JOBS | SAT 8-11-2018 23 SCHEDULED JOBS | SUN 8-12-2018 25 SCHEDULED JOBS |

FIG. 8

AUTOMATED TASK MANAGEMENT TECHNIQUES

BACKGROUND

The present disclosure relates generally to the management of automated tasks, and more specifically, to the management of automated tasks associated with an instance within a multi-instance cloud architecture.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a multi-instance cloud architecture, each instance associated with a customer (i.e., customer instance) is allocated certain portions of physical server resources within the multi-instance cloud architecture, such as computing memory, storage, and processing power. Each instance allows one or more users, such as individuals or an enterprise, to access and utilize the computing resources associated with the instance. A user may be able to schedule execution of one or more jobs using the computing resources allocated to the instance. However, each instance is allocated a finite amount of computing resources. Additionally, hundreds or thousands of jobs associated with the instance may be executing at any one time. For example, some jobs may execute at the same time (e.g., in parallel) or at overlapping times. These jobs may compete for the same computing resources associated with the instance. As a result, some jobs may run slower at particular times during the day or on particular days of the week because there may not be enough computing resources available to execute the jobs during these periods of times.

The disclosed techniques facilitate more efficient management of various jobs (e.g., automated tasks) that may execute within a customer instance over a particular period of time. Specifically, the disclosed techniques provide a user with a job management dashboard from which a user may view and manage jobs (e.g., scheduled jobs, previously executed jobs, currently executing jobs, newly created jobs, or the like) associated with the instance over a particular period of time and access data associated with the jobs without leaving the job management dashboard. For example, the job management dashboard may facilitate scheduling of a new job, providing a visualization of the time at which jobs are scheduled to execute, providing a visualization of the duration of previously executed jobs, providing a visualization of a trend associated with reoccurring jobs, providing a visualization of the status of each job, editing of an existing job, or the like. In this way, the disclosed techniques may facilitate management of one or more scheduled jobs, one or more previously executed jobs, one or more newly created jobs, one or more currently executing jobs, or the like, more efficiently from a single dashboard.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 illustrates the GUI of the job management dashboard of FIG. 5 providing a visualization of one or more jobs associated with the instance in a monthly calendar view, in accordance with aspects of the present disclosure;

FIG. 8 illustrates a job creation window of the job management dashboard of FIGS. 5-7, in accordance with aspects of the present disclosure.

DETAILED DESCRIPTION

Figure 1:
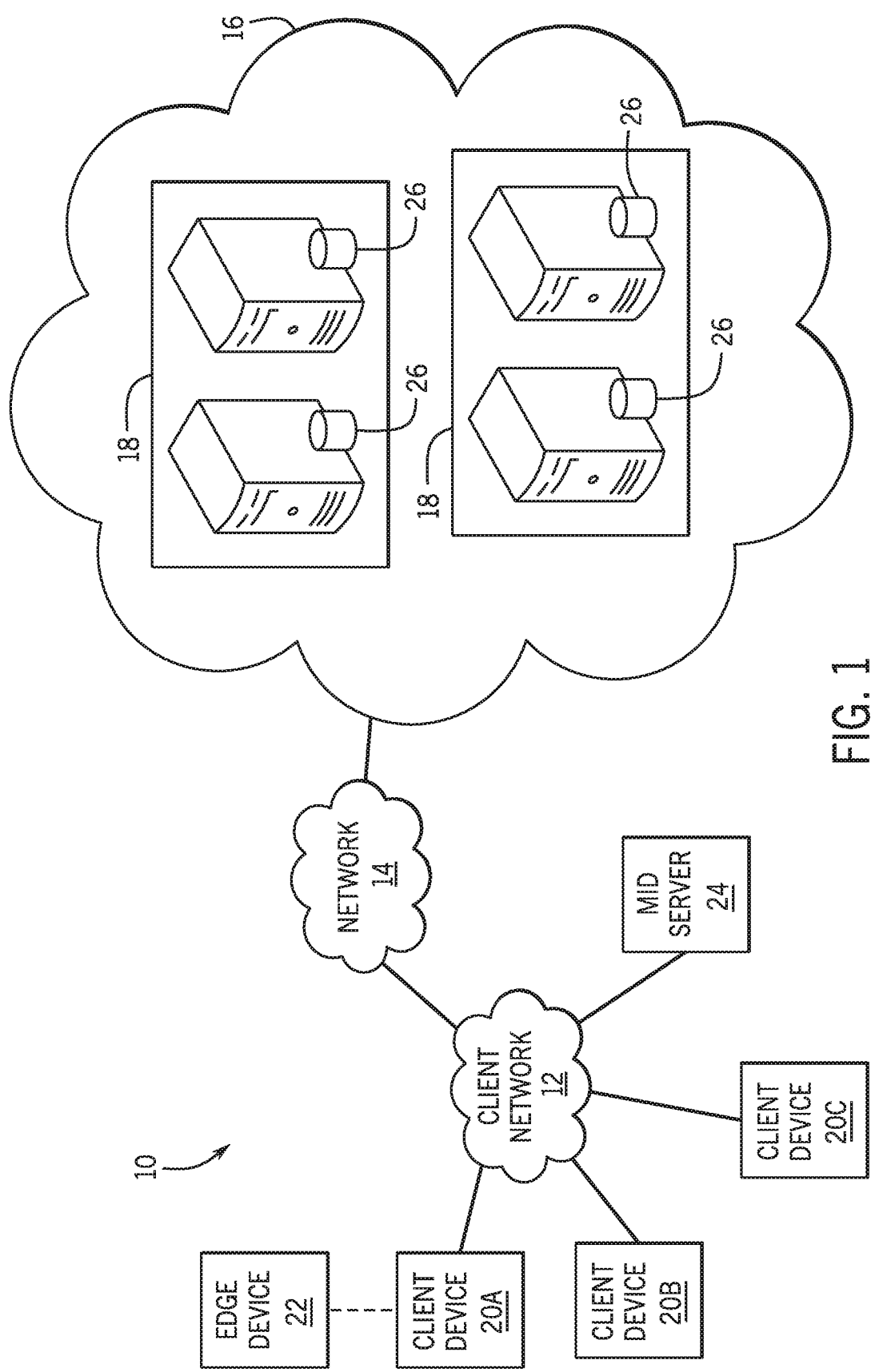
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

In a multi-instance cloud architecture, each instance associated with a customer (i.e., customer instance) is allocated certain portions of physical server resources within the multi-instance cloud architecture, such as computing memory, storage, and processing power. Each instance allows one or more users, such as individuals or an enterprise, to access and utilize the computing resources associated with the instance. A user may be able to schedule execution of one or more jobs using the computing resources allocated to the instance. As used herein, a "job" is an automated task that may be performed by the instance at a particular time or on a recurring schedule. For example, various types of jobs may include running and distributing a report, generating a record (e.g., an incident record, a change record, a configuration item record), executing a business rule, executing scheduled jobs from various scripts, or the like.

However, each instance is allocated a finite amount of computing resources. Additionally, hundreds or thousands of jobs associated with the instance may be executing at any one time. For example, some jobs may execute at the same time (e.g., in parallel) or at overlapping times. These jobs may compete for the same computing resources associated with the instance. As a result, some jobs may run slower at particular times during the day or on particular days of the week because there may not be enough computing resources available to execute the jobs during these periods of times. Accordingly, it may be beneficial to provide a user with various tools that facilitate management of jobs executing within the instance or that are scheduled to execute within the instance over a period of time.

The disclosed techniques facilitate more efficient management of various jobs (e.g., automated tasks) that may execute within a customer instance over a particular period of time. Specifically, the disclosed techniques provide a user with a job management dashboard from which a user may view and manage jobs (e.g., scheduled jobs, previously executed jobs, currently executing jobs, newly created jobs, or the like) associated with the instance over a particular period of time and access data associated with the jobs without leaving the job management dashboard. As used herein, a "dashboard" refers to a GUI screen on which data is visualized to enable interactivity with the visualized data. For example, the job management dashboard may facilitate scheduling of a new job, providing a visualization of the time at which jobs are scheduled to execute, providing a visualization of the duration of previously executed jobs, providing a visualization of a trend associated with reoccurring jobs, providing a visualization of the status of each job, editing of an existing job, or the like. In this way, the disclosed techniques may facilitate management of one or more scheduled jobs, one or more previously executed jobs, one or more newly created jobs, one or more currently executing jobs, or the like, more efficiently from a single dashboard.

In one embodiment, the job management dashboard provides the user with a visualization of each scheduled job, each previously executed job, each currently executing job, or a combination thereof, within a customizable period of time. For example, the user may specify a particular period of time in which to view the jobs, such as a portion of a day, a full day, a portion of a week, a full week, a portion of a month, a full month, or the like. The job management dashboard may display each scheduled job, each previously executed job, each currently executing job, or a combination thereof, within the specified period of time as a separate graphical icon (e.g., discrete block) in a calendar-like view. In this way, a user may determine an amount of jobs scheduled during the specified period of time and/or each type of job scheduled during the specified period of time based on the information displayed on the job management dashboard.

Additionally, the job management dashboard may provide additional data associated with each job. For example, in response to a user hovering over a particular graphical icon representing a job (e.g., with a mouse, via a touchscreen, or the like), the job management dashboard may display an overlay containing the name of the job, the average run time of the job, the actual run time of the job (if available), the expected run time of the job, the execution frequency of the job, the status of the job, or the like. Further, in response to the user selecting the particular graphical icon representing the job (e.g., with a mouse, via a touchscreen, or the like), the job management dashboard may display a window (e.g., a pop-up window) over at least a portion of the job management dashboard that contains a graph of historical run times associated with the job. As such, the job management dashboard may facilitate determination of a trend associated with historical execution times of the job over the specified period of time. If the trend indicates that the job is running slower at a particular day and/or time during the specified period of time, the job management dashboard may facilitate adjustment of a scheduled date and/or time of one or more future occurrences of the same job (e.g., a scheduled job or a newly created job). Accordingly, the disclosed techniques may facilitate efficient optimization of jobs scheduled to execute within a customer instance.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
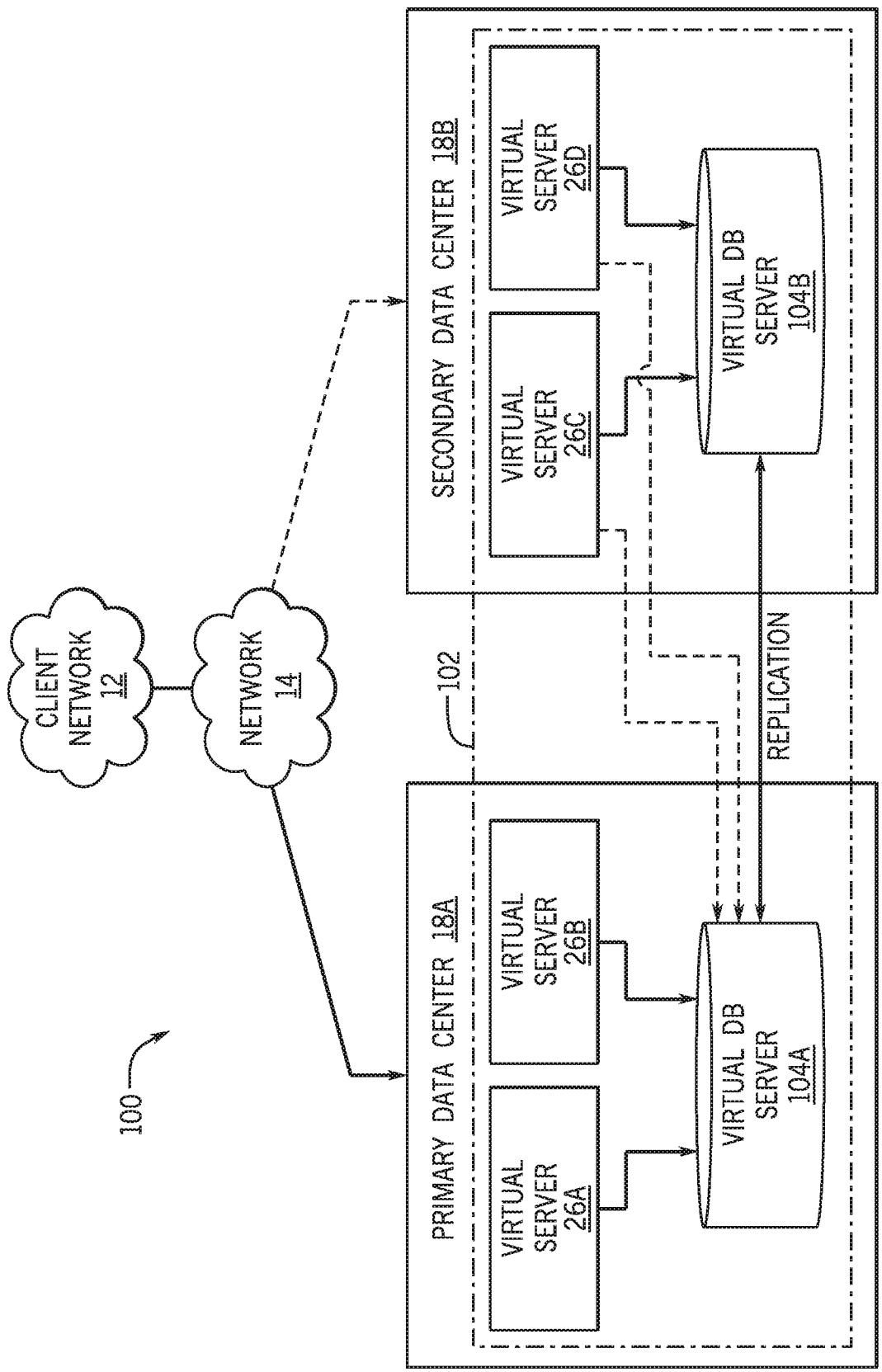
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
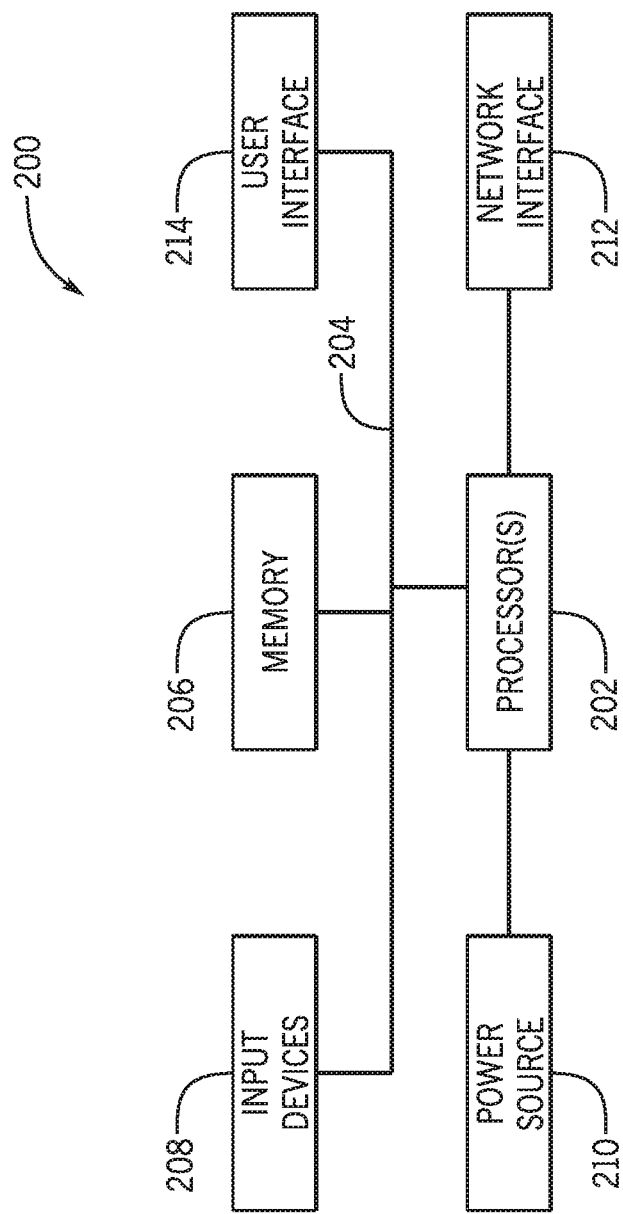
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally, or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
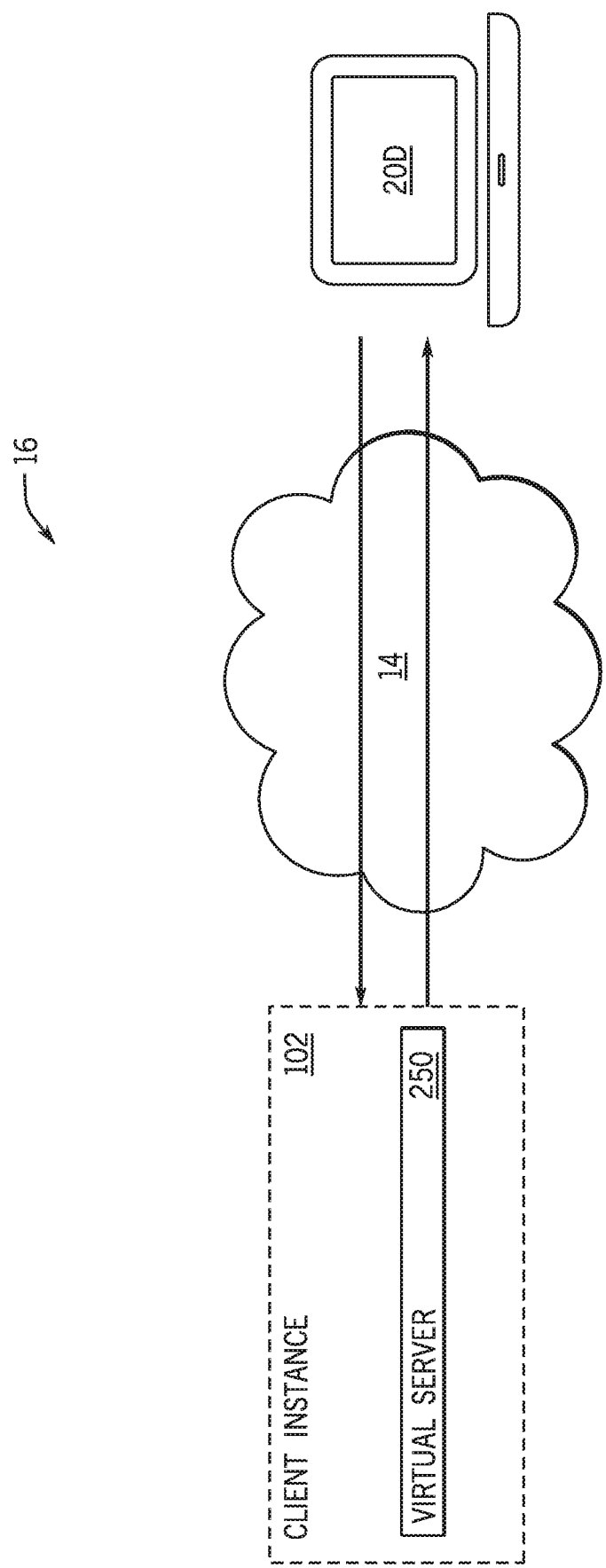
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 250 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2 and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As described above, an instance associated with a customer (i.e., customer instance) is allocated a finite amount of computing resources (e.g., computing memory, storage, and processing power) within a multi-instance cloud architecture. The instance allows one or more users, such as individuals or an enterprise, to access and utilize the computing resources associated with the instance. For example, a user may be able to schedule execution of one or more jobs (e.g., running and distributing a report, generating a record, executing a business rule, executing scheduled jobs from various scripts, or the like) using the computing resources allocated to the instance. Each scheduled job executing at a particular time or at overlapping times (e.g., jobs executing in parallel) may compete for the same computing resources associated with the instance. As a result, some jobs may execute slower at particular times during the day or on particular days of the week because there may be too many jobs executing during those periods of times or not enough computing resources available to support optimal execution of the jobs. Accordingly, the disclosed techniques provide a job management dashboard to facilitate efficient management of various jobs (e.g., scheduled jobs, previously executed jobs, currently executing jobs, newly created jobs, or the like) associated with an instance over a particular period of time. In particular, the job management dashboard may facilitate optimization of an execution time of one or more scheduled jobs or newly created jobs associated with the instance.

Figure 5:
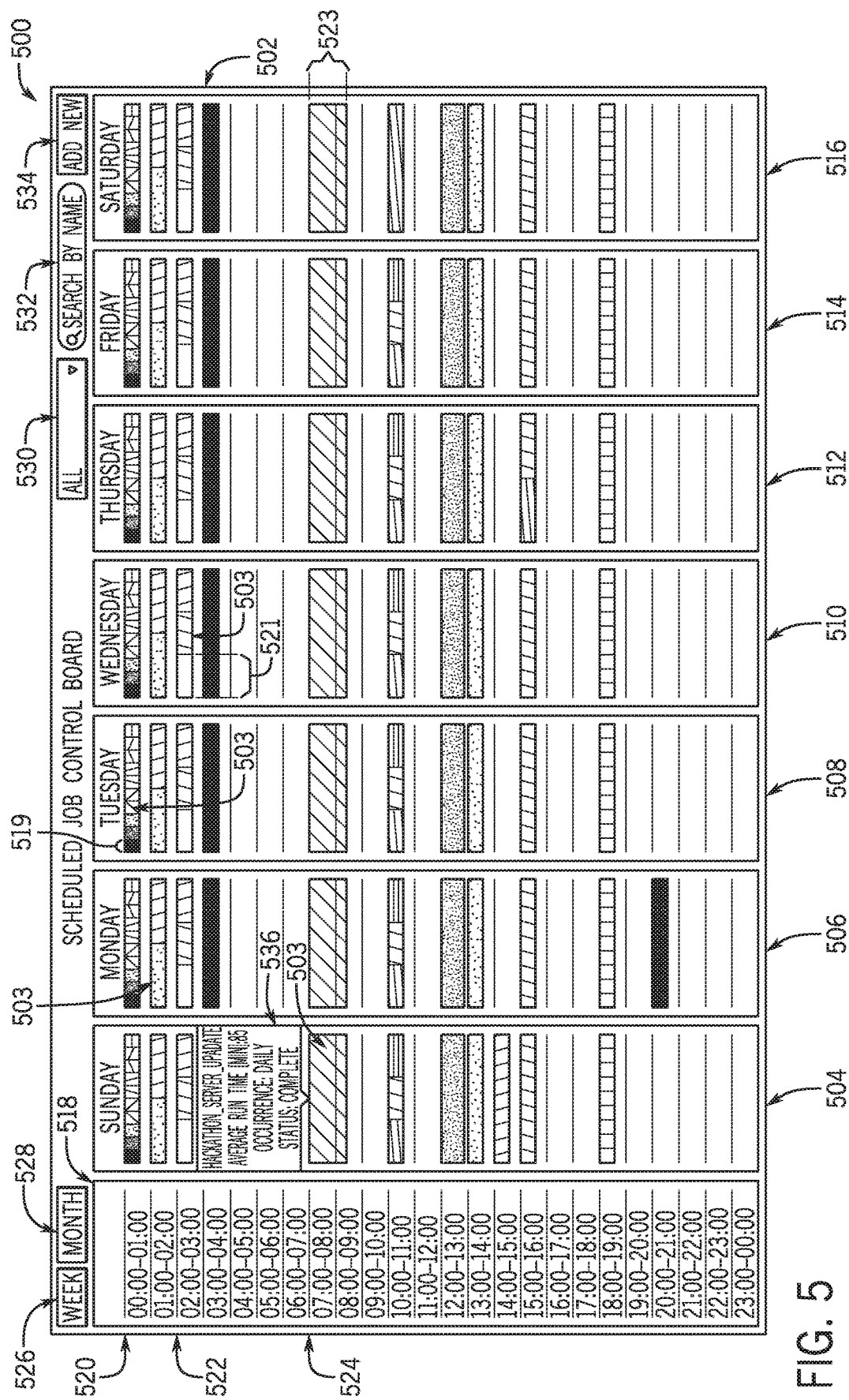
FIG. 5 illustrates a graphical user interface (GUI) of a job management dashboard that provides a visualization of one or more jobs associated with an instance in a weekly calendar view, in accordance with aspects of the present disclosure.

With the preceding in mind, FIG. 5 illustrates a graphical user interface (GUI) 500 of a job management dashboard 502 that provides a visualization of each scheduled job, each previously executed job, each currently executing job, or a combination thereof, within a customizable period of time. Each scheduled job, each previously executed job, and each currently executing job may be represented as a separate graphical icon (e.g., discrete block) 503 within the job management dashboard 502. Additionally, if the job is a reoccurring job, the graphical icon 503 associated with each occurrence of the job over the period of time may be the same (e.g., have the same shading, color, pattern, highlighting, or the like). In this way, various characteristics of a particular job (e.g., 503) may be ascertained from the job management dashboard 502 easily and efficiently. For example, a user may be able to determine the number of jobs executing at a particular time, if a particular job is reoccurring over the displayed period of time, the approximate duration of a particular job, or the like, based on the information displayed to the user via the GUI 500 of the job management dashboard 502. As such, the user may not have to search through various menus and sub-menus or access different windows in order to obtain such information. In some embodiments, the GUI 500 of the job management dashboard 502 may display the number of jobs executing at a particular time (e.g., within the period of time displayed in the GUI 500 of the job management dashboard 502).

In some embodiments, a user may specify a particular time period in which to view each scheduled job, each previously executed job, each currently executing job, or a combination thereof, within the job management dashboard 502. For example, the user may specify a portion of a day, a full day, a portion of a week, a full week, a portion of a month, a full month, or the like. In other embodiments, the job management dashboard 502 may display a particular period of time by default and the user may adjust the period of time displayed via the job management dashboard 502. In the illustrated embodiment, the job management dashboard 502 displays a calendar view of each scheduled job, each previously executed job, each currently executing job, or a combination thereof, within a particular week. For example, the job management dashboard 502 may display each scheduled job, each previously executed job, each currently executing job, or a combination thereof, within a first day 504 of the week, a second day 506 of the week, a third day 508 of the week, a fourth day 510 of the week, a fifth day 512 of the week, a sixth day 514 of the week, and a seventh day 516 of the week.

Each scheduled job, each previously executed job, each currently executing job, or a combination thereof, within a particular day may also be arranged within the job management dashboard 502 by scheduled time. In the illustrated embodiment, a portion 518 of the job management dashboard 502 may display a list of hours within each day (i.e., each hour of the day having a corresponding series of jobs, or lack thereof, under each day of the week). For example, between midnight and 1:00 AM of the third day 510 of the week (e.g., Tuesday), nine individual jobs 503 may be displayed in a row and aligned with a first corresponding time indicator 520 in the portion 518 of the job management dashboard 502. Each job 503 may have a unique representation (e.g., have a unique shading, color, pattern, highlighting, or the like) to distinguish each job 503 from the other jobs 503 in the row. The size of the graphical icon 503 of each job in the row may also dynamically adjust based on the amount of jobs 503 in the row. That is, the width of the graphical icon 503 may be larger when there are less jobs in the row and smaller when there are more jobs in the row. In the illustrated embodiment, for example, between 2:00 AM and 3:00 AM of the fourth day of the week (e.g., Wednesday), three individual jobs 503 may be displayed in a row and aligned with a second corresponding time indicator 522 in the portion 518 of the job management dashboard 502. As compared to a width 519 of the jobs 503 aligned with the first corresponding time indicator 520, the jobs 503 aligned with the second corresponding time indicator may have a larger width 521 because there are fewer jobs in the corresponding row. In some embodiments, when the number of jobs 503 exceeds a threshold amount, a graphical icon (not shown) may be displayed that indicates that there are additional jobs hidden from view. For example, upon selection of the graphical icon (e.g., a "plus" symbol or the like), the GUI 500 of the job management dashboard 502 may update to display the hidden jobs in line with the displayed jobs 503 or beneath the displayed jobs 503. In this way, the GUI 500 of the job management dashboard 502 may dynamically adjust the presentation of information associated with each job in the job management dashboard 502 to facilitate an organized and intuitive display of job information to the user.

Additionally, each graphical icon 503 representing each job may indicate a duration of an executed job or an estimated duration of a scheduled job. In the illustrated embodiment, for example, between 7:00 AM and 8:30 AM of the first day of the week (e.g., Sunday), one job 503 may be displayed in a row and aligned with a third corresponding time indicator 524 in the portion 518 of the job management dashboard 502. The graphical icon 503 of the job may have a vertical length 523 that corresponds to the duration of the job. In some embodiments, the vertical length 523 of the graphical icon 503 of the job may dynamically adjust from a vertical length corresponding to an estimated duration of a scheduled job to the actual duration of the scheduled job after it has been executed. For example, the vertical length corresponding to the estimated duration of the scheduled job may be longer than the actual duration of the scheduled job after it has been executed. As such, the vertical length 523 of the graphical icon 503 of the job may increase accordingly. In another example, the vertical length corresponding to the estimated duration of the scheduled job may be shorter than the actual duration of the scheduled job after it has been executed. As such, the vertical length 523 of the graphical icon 503 of the job may decrease accordingly. In this way, the job management dashboard 502 may provide and display accurate and up-to-date information associated with previously executed and scheduled jobs to the user.

The GUI 500 of the job management dashboard 502 may also provide different calendar views of the job management dashboard 502. For example, the user may specify a particular period of time in which to view the jobs 503, such as a portion of a day, a full day, a portion of a week, a full week, a portion of a month, a full month, or the like. In the illustrated embodiment, the user may select a first graphical icon 526 to switch to a weekly calendar view or a second graphical icon 528 to switch to a monthly calendar view. For example, upon selection of the first graphical icon 526, the GUI 500 of the job management dashboard 502 may display the weekly calendar view as illustrated in FIG. 5. The particular week displayed in the weekly calendar view may default to the current week. However, in some embodiments, the particular week displayed in the weekly calendar view may be defined after selection of the first graphical icon 526. For example, upon selection of the first graphical icon 526, a calendar overlay may be shown within the job management dashboard 502 that represents each week within the current month. The user may then select a particular week within the calendar overlay to display in the weekly calendar view of the job management dashboard 502. In some embodiments, the user may also adjust the month displayed in the calendar overlay to a previous month or a future month and then select a particular week in either the previous month or the future month to display in the weekly calendar view of the job management dashboard 502. The user may also adjust the week displayed from within the calendar view of the job management dashboard 502. For example, the job management dashboard 502 may display one or more graphical icons configured to adjust the week displayed in the weekly calendar view to a previous week or a future week. Upon selection of the corresponding graphical icon, the GUI 500 of the job management dashboard 502 may update to display the desired week.

As mentioned above, the user may select the second graphical icon 528 to switch to a monthly calendar view. For example, upon selection of the second graphical icon 528, the GUI 500 of the job management dashboard 502 may display the monthly calendar view as illustrated in FIG. 6. FIG. 6 illustrates a GUI 600 of the job management dashboard 602 providing an exemplary visualization of each scheduled job, each previously executed job, each currently executing job, or a combination thereof, within a particular month. As described above, the user may select a first graphical icon 626 in the GUI 600 of the job management dashboard 602 to switch to a weekly calendar view (e.g., as illustrated in FIG. 5).

In the illustrated embodiment, the GUI 600 of the job management dashboard 602 may display a monthly calendar view that provides a visualization of each scheduled job, each previously executed job, each currently executing job, or a combination thereof, within the displayed monthly calendar view. For example, a number of scheduled jobs 606, a number of previously executed jobs, a number of currently executing jobs, or a combination thereof, may displayed within each graphical representation 604 of each day within each month. In some embodiments, each scheduled job, each previously executed job, each currently executing job, or a combination thereof, may be represented as a separate graphical icon (e.g., a discrete block) within the graphical representation 604 of each day within the month. If the job is a reoccurring job, the graphical icon associated with each occurrence of the job within the month, or across different months, may be the same (e.g., have the same shading, color, pattern, highlighting, or the like).

In some embodiments, each scheduled job, each previously executed job, each currently executing job, or a combination thereof, within a particular day may also be arranged within the job management dashboard 502 by scheduled time. For example, each graphical icon representing a job within the graphical representation 604 of each day may be arranged within the graphical representation 604 of each day in order based on the execution time of the previously executed job, the scheduled execution time of a schedule job, the scheduled execution time and/or the actual execution time of a currently executing job, or a combination thereof. In some embodiments, each graphical icon representing a job within the graphical representation 604 of each day may be displayed in one or more rows. The size of the graphical icon of each job in a respective row may also dynamically adjust based on the amount of jobs in the row. That is, the width of the graphical icon may be larger when there are less jobs in the row and smaller when there are more jobs in the row. In this way, the GUI 600 of the job management dashboard 602 may dynamically adjust the presentation of information associated with each job in the job management dashboard 602 to facilitate an organized and intuitive display of job information to the user. As described above, each graphical icon representing each job may also indicate a duration of an executed job or an estimated duration of a scheduled job. For example, a vertical length of each graphical icon may correspond to the duration of the executed job or the estimated duration of the scheduled job.

Figure 7:
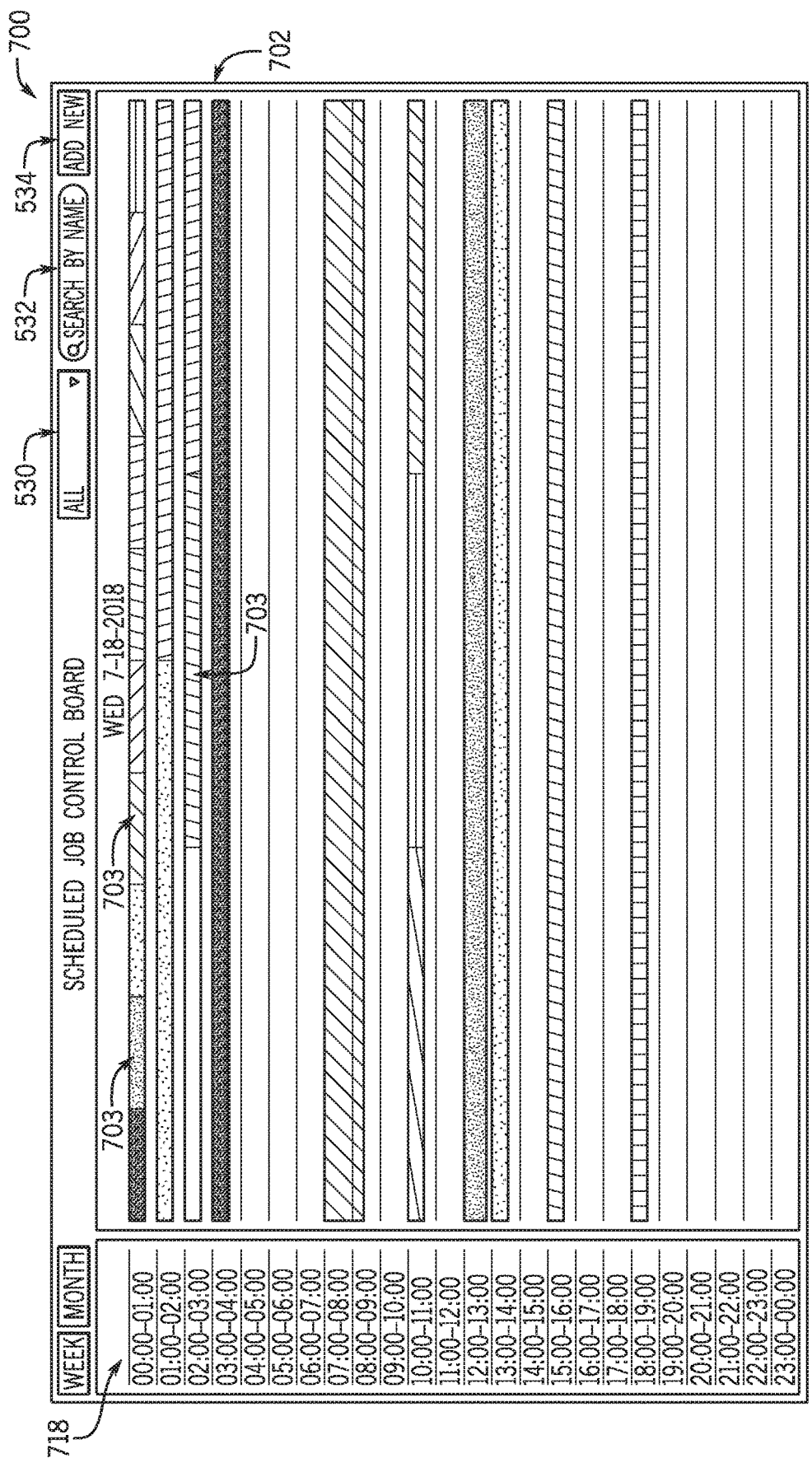
FIG. 7 illustrates the GUI of the job management dashboard of FIGS. 5 and 6 providing a visualization of one or more jobs associated with the instance in a daily calendar view, in accordance with aspects of the present disclosure.

Further, the graphical icon associated with each occurrence of the job may be the same between the weekly calendar view as illustrated in FIG. 5, the monthly calendar view as illustrated in FIG. 6, and a daily calendar view as illustrated in FIG. 7. For example, in response to a user selecting a graphical representation 604 of a particular day within the monthly calendar view or the weekly calendar view, the GUI 500, 600 of the job management dashboard 502, 602 may update to display the daily calendar view that provides a visualization of each scheduled job, each previously executed job, each currently executing job, or a combination thereof, within the displayed daily calendar view. In some embodiments, the user may select a third graphical icon within the GUI 500, 600 of the job management dashboard 502, 602 to update the GUI 500, 600 to display the daily calendar view. For example, upon selection of the third graphical icon, a calendar overlay may be shown within the job management dashboard 502, 602 that represents each day within the current month. The user may then select a particular day within the calendar overlay to display in the daily calendar view of the job management dashboard 502, 602.

FIG. 7 illustrates a GUI 700 of the job management dashboard 702 providing an exemplary visualization of each scheduled job, each previously executed job, each currently executing job, or a combination thereof, within the daily calendar view of a particular day. As described above, each scheduled job, each previously executed job, each currently executing job, or a combination thereof, may be presented as a separate graphical icon (e.g., discrete block) 703 within the job management dashboard 702. If the job is a reoccurring job, the graphical icon 702 associated with each occurrence of the job within the day, or across different days, may be the same (e.g., have the same shading, color, pattern, highlighting, or the like). In the illustrated embodiment, each scheduled job, each previously executed job, each currently executing job, or a combination thereof, within the daily calendar view of a particular day may be arranged by scheduled time. For example, a portion 718 of the job management dashboard 702 may display a list of hours within the day (i.e., each hour of the day having a corresponding series of jobs, or lack thereof). Each job 703 with substantially the same scheduled time for execution may be aligned in a row corresponding to the scheduled time in the portion 718 of the job management dashboard 702. In the illustrated embodiment, for example, each job 703 scheduled to run between 12:00 AM and 1:00 AM are presented in a row.

As described above, the size of the graphical icon 703 of each job in the row may also dynamically adjust based on the amount of jobs 703 in the row. That is, the width of the graphical icon 703 may be larger when there are less jobs in the row and smaller when there are more jobs in the row. Additionally, each graphical icon 703 representing each job may indicate a duration of an executed job or an estimated duration of a scheduled job. That is, a vertical length of the graphical icon 703 of each job may correspond to the duration of an executed job or an estimated duration of a scheduled job.

Referring to FIGS. 5-7, the GUI 500, 600, 700 of the job management dashboard 502, 602, 702 may facilitate refining the types of information displayed within the job management dashboard 502, 602, 702. In the illustrated embodiments, the user may select one or more predefined filters 530 (e.g., from a drop down list). The predefined filters 530 may include an option to display all jobs, an option to display jobs having a duration of less than thirty minutes, an option to display jobs having a duration between thirty minutes and an hour, an option to display jobs having a duration of more than an hour, or the like. In response to a user selecting a predefined filter 530, the GUI 500, 600, 700 of the job management dashboard 502, 602, 702 may display jobs that satisfy the selected predefined filter 530 and hide jobs that do not satisfy the selected predefined filter 530. In some embodiments, one or more customizable filters 530 may be created and/or modified by the user. Additionally, the user may also submit a query with a particular term or phrase in a search box 532. In response to the user submitting the query, the GUI 500, 600, 700 of the job management dashboard 502, 602, 702 may display jobs that satisfy the query and hide jobs that do not satisfy the query. For example, the user may submit a query based on a name of one or more jobs, a scheduled time of one or more jobs, a scheduled date of one or more jobs, a type of one or more jobs, a type of record associated with one or more jobs (e.g., an incident, or a change, or a configuration item record), or the like.

Figure 8:
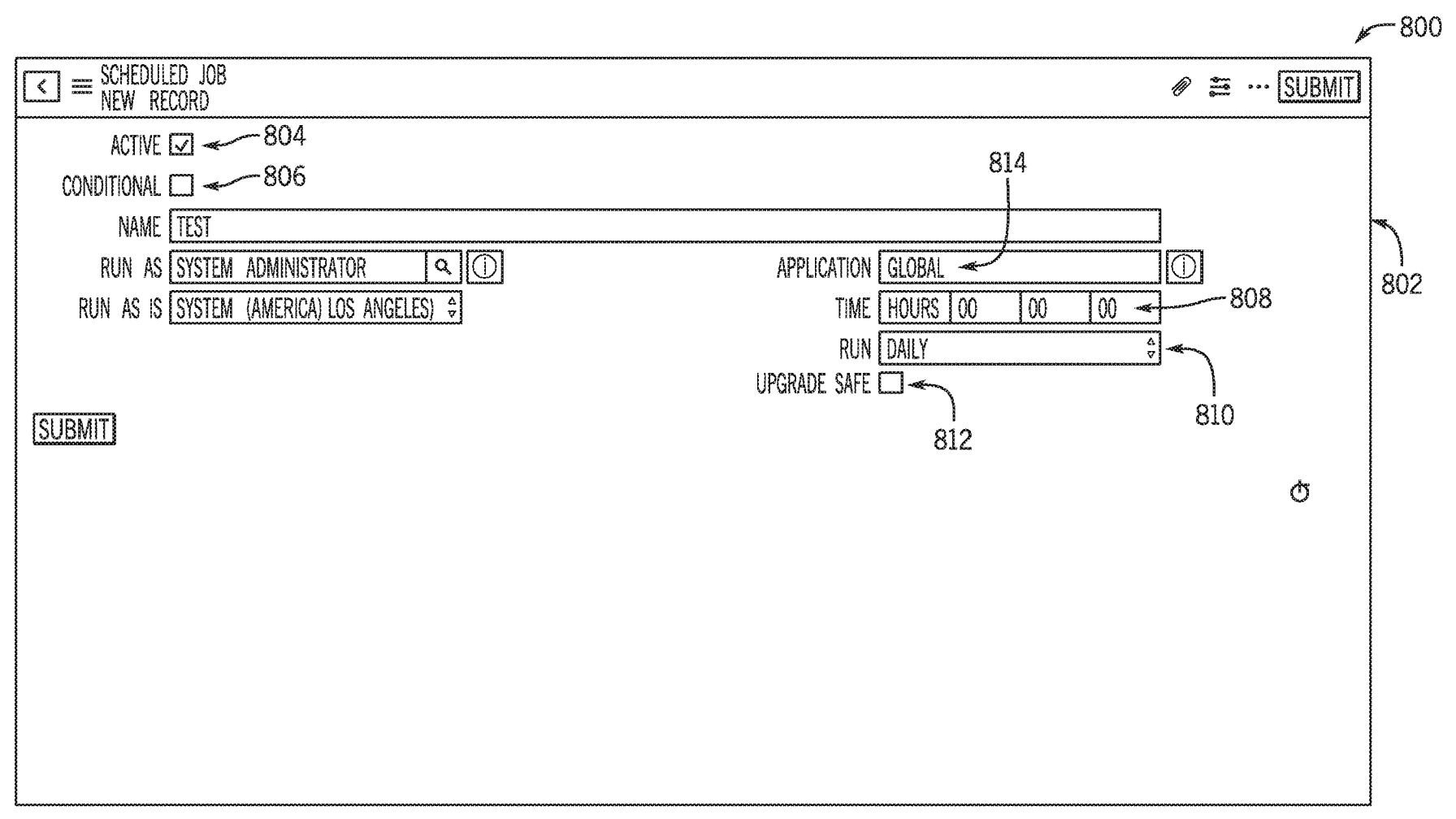

The GUI 500, 600, 700 of the job management dashboard 502, 602, 702 may also facilitate the creation of a new job or the scheduling of a new job in response to a user selection of a graphical icon 534 in the job management dashboard 502, 602, 702. FIG. 8 illustrates a job creation window 802 of the GUI 800 of the job management dashboard 502, 602, 702. In response to a selection of the graphical icon 534 in the job management dashboard 502, 602, 702, the GUI 800 may display the job creation window 802 to allow the user to create one or more jobs to be executed within the instance associated with the job management dashboard 502, 602, 702. In some embodiments, the job creation window 802 may be displayed as an overlay over at least a portion of the job management dashboard 502, 602, 702.

As illustrated in FIG. 8, the user may customize a newly created job using one or more customizable features in the job creation window 802. The user may define whether the newly created job is active or inactive by selecting a first option 804 in the job creation window 802. For example, when the first option 804 is deselected, the newly created job may not execute within the instance associated with the job management dashboard 502, 602, 702, and when the first option 804 is selected, the newly created job may execute within the instance. The user may also define whether the newly created job is based on one or more conditions. For example, in response to a user selection of a second option 806, the job creation window 802 may display a text box for accepting script to define one or more conditions associated with execution of the newly created job. In some embodiments, the job creation window 802 may display one or more selectable conditions (e.g., one or more predefined conditions, one or more customizable conditions, or the like) that the user may select to define the conditions on which the newly created job may be executed within the instance.

Additionally, the user may define a time at which the newly created job is executed within the instance. In the illustrated embodiment, for example, the user may submit a particular time (e.g., hour, minute, second) of a particular day in one or more user input fields 808. The user may also define a frequency of execution of the newly created job. For example, the user may select a particular frequency from a drop down box 810 to set the frequency of execution of the newly created job as hourly, daily, weekly, biweekly, monthly, or the like. Further, the user may also set whether the newly created job is upgrade safe. For example, when a third option 812 in the job creation window 802 is selected, the newly created job may be allowed to execute at a scheduled time during an upgrade of the instance (e.g., a software upgrade associated with the instance), and when the third option in the job creation window 802 is deselected, the newly created job may be prohibited from executing during an upgrade of the instance. The user may also set whether the job is global or not. For example, when a fourth option 814 is set to "Global," the job may be executed across multiple domains, but when the fourth option 814 is set to "Separate," the job may be limited to execution in a particular domain designated by the user. In some embodiments, the priority of the job may be configured by the user to have a high priority, a normal priority, or a low priority. In this way, the user may configure two or more jobs to be executed at the same time or overlapping times but implement each job based on their respective priorities. For example, a higher priority job may start executing within the instance before a lower priority job. After the user has completed defining the newly created job within the job creation window 802, the newly created job may be added to the job management dashboard 502, 602, 702. That is, the newly created job and any reoccurring jobs associated with the newly created job may be displayed as respective graphical icons within the job management dashboard 502, 602, 702.

Referring back to FIGS. 5-7, the GUI 500, 600, 700 of the job management dashboard 502, 602, 702 may also provide additional data associated with each job in response to one or more user inputs associated with a particular graphical icon corresponding to the job. As illustrated in FIG. 5, in response to the user hovering (e.g., with a mouse or the like) over a particular graphical icon 503 representing a job, the GUI 500 of the job management dashboard 502 may display an information overlay 536 containing additional information associated with the job. For example, the information overlay 536 may include a name of the job, an average run time of the job, an actual run time of the job, an expected run time of the job, an execution frequency of the job (e.g., hourly, daily, weekly, or monthly), a status of the job (e.g., complete, incomplete, error, in progress, or paused), a combination thereof, or the like. In some embodiments, one or more these types of information associated with the job may be displayed within the particular graphical icon 503 representing the job. For example, in addition to, or instead of, being displayed in the information overlay 536, the particular graphical icon 503 representing the job may display the name of the job, the execution frequency of the job, the status of the jobs, or a combination thereof. Additionally, the GUI 500 of the job management dashboard 502 may facilitate customization of the information displayed within each graphical icon 503 representing a respective job and/or the information that may be displayed within the information overlay 536.

Further, the information displayed within each graphical icon 503 representing a respective job and/or the information that may be displayed within the information overlay 536 may automatically update to provide real-time information associated with a particular job. For example, before the job is executed, the information overlay 536 may display the expected run time of the job. While the job is executing, the information overlay 536 may update to display the expected run time of the job and the actual run time of the job (e.g., how much time has passed since the job began executing within the instance). After the job has finished executing, the information overlay 536 may update to display the actual run time of the job (e.g., how much time passed for complete execution of the job). Additionally, the expected run time of the job may update based on real-time conditions of the processing environment associated with the instance before the job has executed within the instance and while the job is executing within the instance. In this way, the GUI 500, 600, 700 of the job management dashboard 502, 602, 702 may provide the user with real-time information associated with each scheduled job, each previously executed job, each currently executing job, or a combination thereof, associated with the instance.

Figure 9:
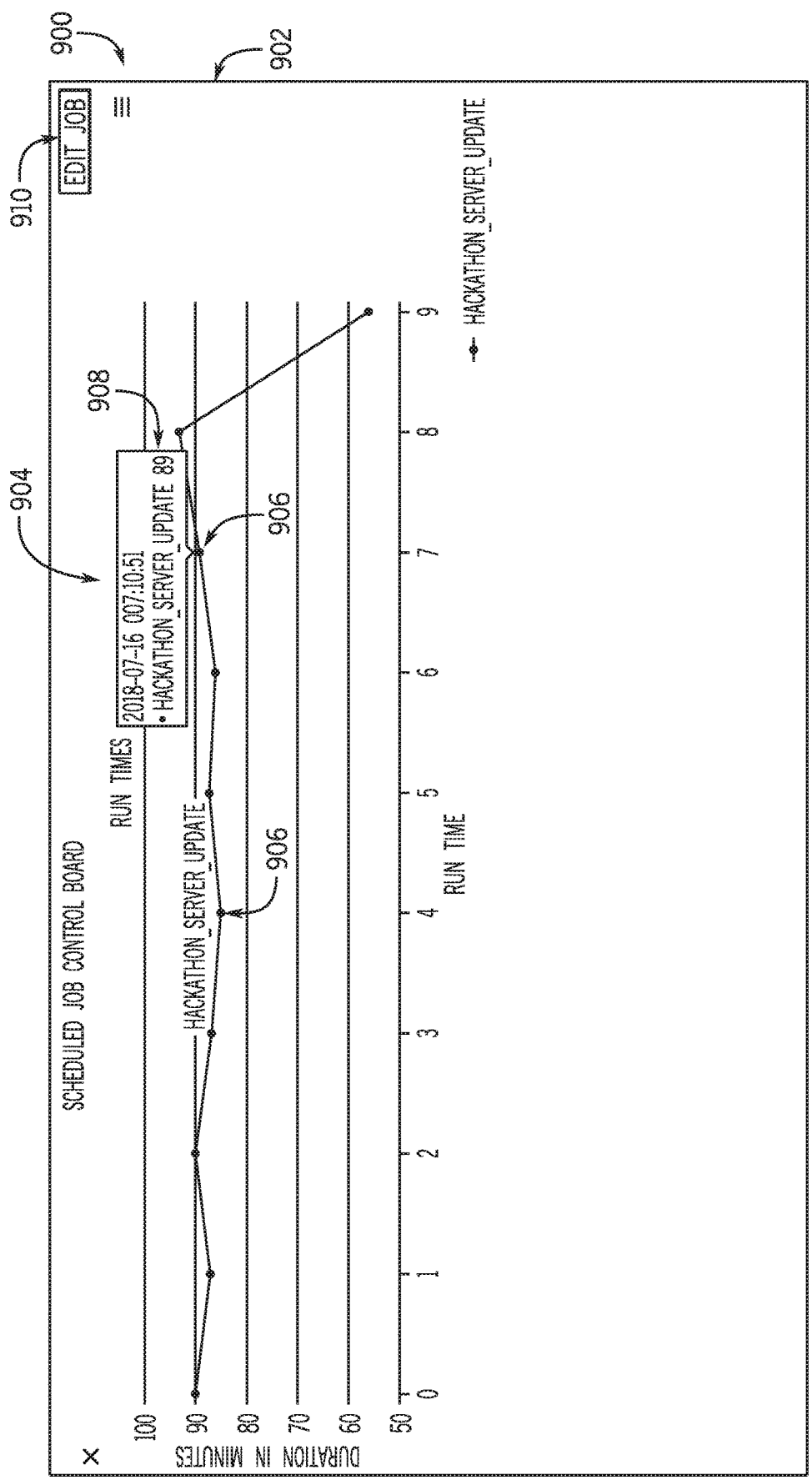
FIG. 9 illustrates a job overview window of the job management dashboard of FIGS. 5-7, in accordance with aspects of the present disclosure.

In some embodiments, the GUI 500, 600, 700 of the job management dashboard 502, 602, 702 may display a window that provides additional information associated with a particular job in response to the user selecting or clicking (e.g., with a mouse or the like) the particular job within the job management dashboard 502, 602, 702. With the foregoing in mind, FIG. 9 illustrates a job overview window 902 of the GUI 900 of the job management dashboard 502, 602, 702. The job overview window 902 may display one or more graphs associated with the run time of the particular job the user selected via the job management dashboard 502, 602, 702 and respective run times of other jobs having the same job type. In the illustrated embodiment, for example, the GUI 900 of the job management dashboard 502, 602, 702 may display a line graph 904 of one or more run times 906 of respective jobs having the same job type as the selected job. The run times 906 in the line graph 904 may include each previously executed occurrence of the job, a currently executing occurrence of the job, each scheduled occurrence of the job, or a combination thereof. Additionally, the line graph 904 may update to provide real-time information associated with each occurrence of the job in the line graph 904. For example, when a currently executing job within the instance completes, the line graph 904 may update to reflect the actual execution time of the completed job (i.e., instead of an estimated execution time). Additionally, the line graph 904 may update after a scheduled job begins to execute to reflect a current estimated execution time of the scheduled job based on real-time conditions of the processing environment associated with the instance. In this way, the job overview window 902 may facilitate determination of a trend associated with the execution time of the selected job over a period of time.

Based on the line graph 904, the user may determine that a particular occurrence of the job at a particular time is executing slower than other occurrences of the job at different times based on the line graph 904. In some embodiments, the job overview window 902 may visually indicate a slower execution of the job in the job overview window, such as a particular shading, highlighting, pattern, or color applied to the slower execution of the job in the line graph 904. That is, the data point (e.g., 906) in the line graph 904 corresponding to the slower execution of the job may have a different shading, highlighting, pattern or color than other data points corresponding to other executions of the job in the line graph. In some embodiments, the visual indication of the slower execution of the job may also be applied to the corresponding graphical icon of the job within the job management dashboard 502, 602, 702.

The job overview window 902 may also provide additional information associated with the job in response to one or more user inputs associated with a particular execution of the job (e.g., data point 906) in the line graph 904. As illustrated in FIG. 9, in response to the user hovering (e.g., with a mouse or the like) over the data point 906 in the line graph corresponding to an execution of the job, the GUI 900 may display an information overlay 908 in the job overview window 902 containing additional information associated with the particular execution of the job. For example, the information overlay 908 may include the name of the job, the actual run time of the job, the expected run time of the job, a status of the job, the time and date associated with execution of the job, a combination thereof, or the like. Additionally, in response to the user selecting the data point 906 corresponding to a particular execution of the job, the GUI 900 may display a job editing window that allows the user to edit one or more features of the job. In some embodiments, the job editing window may be similar to the job creation window 802 illustrated in FIG. 8. For example, the job editing window may provide the user with customizable options for defining whether the job is active or inactive, one or more conditions associated with execution of the job, a time and/or date at which the job is scheduled to run, a frequency of execution of the job, whether the job is upgrade safe or not, whether the job is "Global" or "Separate," a priority setting of the job, or the like. Additionally or alternatively, the user may access the job editing window via selection of an edit job option 910 in the job overview window 902. In this way, the user may be able to identify problematic jobs associated with the instance and fine tune one or more features of the jobs to optimize execution of the jobs within the instance.

Although a line graph 904 is illustrated in FIG. 9, in other embodiments, other types of graphs or data organization tools may be displayed within the job overview window 902. For example, a bar graph, a scatter plot, a histogram, or the like may be displayed in the job overview window 902. In some embodiments, the scale of the line graph 904 may be customized by the user. For example, the user may reduce the number of run times displayed in the line graph 904 or increase the number of run times displayed in the line graph 904. In other embodiments, the user may adjust the scale of the line graph 904 based on a customizable period of time (e.g., a day, two or more days, a week, two or more weeks, a month, or the like).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor; and
a memory, accessible by the processor, the memory storing instructions, that when executed by the processor, cause the processor to perform operations comprising:
generating a graphical user interface (GUI) for display on a display device, wherein the GUI comprises a job management dashboard including a plurality of graphical icons representative of respective jobs associated with a client instance, wherein two or more graphical icons of the plurality of graphical icons are displayed horizontally adjacent to each other within a composite graphical icon based on an overlap between respective run times of the respective jobs associated with the two or more graphical icons or respective expected run times of the respective jobs associated with the two or more graphical icons;
receiving one or more user inputs indicative of a selection of a particular graphical icon of the plurality of graphical icons in the job management dashboard; and
transmitting, to the display device, an update to the GUI in response to receiving the one or more user inputs indicative of the selection of the particular graphical icon, wherein the updated GUI comprises a job overview window associated with a particular job of the respective jobs, wherein the job overview window comprises a graph of respective run times associated with one or more historical executions of the particular job over a period of time and respective expected run times associated with one or more scheduled executions of the particular job over the period of time.

2. The system of claim 1, wherein the respective jobs associated with the client instance comprise one or more previously executed jobs within the client instance, one or more currently executing jobs within the client instance, or one or more scheduled jobs within the client instance, or a combination thereof.

3. The system of claim 1, wherein the plurality of graphical icons representative of the respective jobs is arranged within the job management dashboard based on an execution start time of the respective jobs.

4. The system of claim 1, wherein the operations comprise:
receiving one or more additional user inputs indicative of a hover over a particular graphical icon of the plurality of graphical icons in the job management dashboard; and
transmitting, to the display device, an additional update to the GUI in response to receiving the one or more additional user inputs indicative of the hover over the particular graphical icon, wherein the updated GUI comprises an information overlay including a name of a particular job of the respective jobs corresponding to the particular graphical icon, an average run time of the particular job, an actual run time of the particular job, an expected run time of the particular job, an execution frequency of the particular job, or a status of the particular job, or a combination thereof.

5. The system of claim 1, wherein the job management dashboard comprises a weekly calendar view of the plurality of graphical icons representative of respective jobs associated with a client instance.

6. The system of claim 5, comprising:
receiving one or more additional user inputs indicative of a selection to view a monthly calendar view of the plurality of graphical icons in the job management dashboard; and
transmitting, to the display device, an additional update to the GUI in response to receiving the one or more additional user inputs indicative of the selection to view a monthly calendar view of the plurality of graphical icons in the job management dashboard, wherein the updated GUI comprises the monthly calendar view of the plurality of graphical icons.

7. The system of claim 5, comprising:
receiving one or more additional user inputs indicative of a selection to view a daily calendar view of the plurality of graphical icons in the job management dashboard; and
transmitting, to the display device, an additional update to the GUI in response to receiving the one or more additional user inputs indicative of the selection to view a daily calendar view of the plurality of graphical icons in the job management dashboard, wherein the updated GUI comprises the daily calendar view of the plurality of graphical icons.

8. The system of claim 1, wherein the graph is configured to display a trend of the respective run times and the respective expected run times over the period of time.

9. A method, comprising:
generating a graphical user interface (GUI) for display on a display device, wherein the GUI comprises a job management dashboard including a plurality of graphical icons representative of respective jobs associated with a client instance, wherein the plurality of graphical icons is arranged within the job management dashboard according to respective run times or respective expected run times associated with the respective jobs, wherein two or more graphical icons of the plurality of graphical icons are displayed horizontally adjacent to each other within a composite graphical icon based on an overlap between the respective run times of two or more jobs of the respective jobs associated with the two or more graphical icons or the respective expected run times of the two or more jobs;
receiving data associated with respective executions of the two or more jobs within the client instance, wherein the two or more jobs are executing in parallel;
determining respective estimated run times until completion of the two or more jobs within the client instance; and
dynamically updating respective appearances of the two or more graphical icons in the job management dashboard that correspond to the two or more jobs in response to determining the respective estimated run times until completion of the two or more jobs within the client instance, wherein respective sizes of the two or more graphical icons are increased in response to determining that the respective estimated run times until completion of the two or more jobs have increased and the respective sizes of the two or more graphical icons are decreased in response to determining that the respective estimated run times until completion of the two or more jobs have decreased.

10. The method of claim 9, wherein receiving data associated with the respective executions of the two or more jobs within the client instance, determining the respective estimated run times until completion of the two or more jobs within the client instance, and dynamically updating the respective appearances of the two or more graphical icons in the job management dashboard that correspond to the two or more jobs are continuously performed until the respective executions of the two or more jobs have stopped.

11. The method of claim 9, comprising:
receiving additional data associated with a processing environment of the client instance;
determining an estimated run time of a scheduled job to be executed within the client instance; and
dynamically updating an appearance of an additional graphical icon of the plurality of graphical icons in the job management dashboard that corresponds to the scheduled job in response to determining the estimated run time, wherein a size of the additional graphical icon is increased in response to determining that the estimated run time of the scheduled job has increased and the size of the graphical icon is decreased in response to determining that the estimated run time of the scheduled job has decreased.

12. The method of claim 9, comprising:
receiving one or more user inputs indicative of a filter to be applied to the respective jobs represented by the plurality of graphical icons in the job management dashboard; and
transmitting, to the display device, an update to the GUI in response to receiving the one or more user inputs indicative of filter, wherein the updated GUI displays a subset of the plurality of graphical icons in the job management dashboard and removes an additional subset of the plurality of graphical icons from the job management dashboard.

13. The method of claim 12, wherein the filter comprises displaying one or more jobs having an execution time of less than thirty minutes or displaying one or more jobs having an execution time of less than an hour.

14. A non-transitory, computer-readable medium, comprising instructions that when executed by one or more processors, cause the one or more processors to perform operations comprising:
generating a graphical user interface (GUI) for display on a display device, wherein the GUI comprises a job management dashboard including a plurality of graphical icons representative of respective jobs associated with a client instance, wherein two or more graphical icons of the plurality of graphical icons are displayed horizontally adjacent to each other within a composite graphical icon based on an overlap between respective run times of two or more jobs of the respective jobs associated with the two or more graphical icons;
receiving data associated with execution of a particular job of the two or more jobs within the client instance;
determining a respective run time of the particular job after the particular job has completed execution within the client instance;

determining that the respective run time of the particular job is slower than one or more historical run times associated with respective previously executed jobs of the same type as the particular job; and modifying an appearance of a graphical icon of the two or more graphical icons in the job management dashboard that corresponds to the particular job in response to determining that the respective run time of the particular job is slower than the one or more historical run times.

15. The non-transitory, computer-readable medium of claim 14, wherein modifying the appearance of the graphical icon comprises applying a highlighting, a shading, or a pattern, or a combination thereof, to the graphical icon in the job management pattern.

16. The non-transitory, computer-readable medium of claim 14, wherein each graphical icon of the plurality of graphical icons comprises a name of a corresponding job, an execution frequency of the corresponding job, or a status of the corresponding job, or a combination thereof.

17. The non-transitory, computer-readable medium of claim 14, wherein the particular job is a reoccurring job within the client instance.

18. The non-transitory, computer-readable medium of claim 17, wherein the operations comprise receiving one or more user inputs indicative of a modification to a time associated with the particular job or a frequency of the particular job, or both.

19. The non-transitory, computer-readable medium of claim 18, wherein the operations comprise transmitting, to the display device, an update to the GUI in response to receiving the one or more user inputs, wherein the updated GUI comprises a modified arrangement of one or more additional graphical icons of the plurality of graphical icons that respectively correspond to additional occurrences of the particular job within the client instance, wherein the modified arrangement of the one or more additional graphical icons corresponds to the modification to the time associated with the particular job or the frequency of the particular job, or both.

20. The non-transitory, computer-readable medium of claim 14, wherein the respective jobs comprise respective automated tasks that may be performed by the client instance at respective execution times.

* * * * *